United States Patent [19]

Peacock

[11] Patent Number: 5,574,084
[45] Date of Patent: Nov. 12, 1996

[54] ETHYLENE BASED HOT MELT ADHESIVES AND MODIFIERS FOR THOSE HOT MELT ADHESIVES

[75] Inventor: Andrew J. Peacock, Houston, Tex.

[73] Assignee: Exxon Chemical Patents, Inc., Wilmington, Del.

[21] Appl. No.: 339,312

[22] Filed: Nov. 14, 1994

Related U.S. Application Data

[63] Continuation-in-part of Ser. No. 48,705, Apr. 16, 1993, abandoned.

[51] Int. Cl.$^6$ .................. C08J 3/00; C08K 3/20; C08L 31/00; C08L 33/00
[52] U.S. Cl. .................. 524/270; 428/424.4; 524/186; 524/191; 524/271; 524/272; 524/284; 524/379; 524/356; 524/366; 524/354; 524/484; 524/502; 524/556; 524/562; 524/563
[58] Field of Search .................. 524/270, 271, 524/272, 379, 484, 502, 556, 562, 563, 191, 186, 284, 356, 366, 354; 428/424.4

[56] References Cited

U.S. PATENT DOCUMENTS

| | | | |
|---|---|---|---|
| 4,479,840 | 10/1984 | Takegawa et al. | 524/543 |
| 5,100,944 | 3/1992 | Walker et al. | 524/503 |

*Primary Examiner*—Paul R. Michl
*Assistant Examiner*—Patrick Niland
*Attorney, Agent, or Firm*—John E. Schneider; Frank E. Reid

[57] ABSTRACT

Modifiers for ethylene copolymers for use in hot melt adhesives are provided, particularly modifiers for ethylene vinyl acetate-based adhesives which improve adhesive properties are provided. Blends comprising ethylene copolymers, modifiers and tackifiers and applications thereof are also provided for.

27 Claims, No Drawings

ETHYLENE BASED HOT MELT ADHESIVES AND MODIFIERS FOR THOSE HOT MELT ADHESIVES

This is a file wrapper continuation-in-part, of application Ser. No. 08/048,705, filed Apr. 16, 1993 now abandoned.

FIELD OF THE INVENTION

This invention relates to polyethylene-based hot melt adhesives modified with an aliphatic hydrocarbon modifier for improved hot melt adhesives.

BACKGROUND OF THE INVENTION

Ethylene is known to be polymerizable with many comonomers to form polyethylene copolymers of many different types ranging from hard impact resistant plastics and thermoplastics, to soft elastic films, to hard, rubbery elastomeric tires and the like. Polyethylene can also be blended with other polyolefins to optimize properties.

Ethylene copolymers are also useful as components in adhesives; in particular they can be used in hot melt adhesive compositions, and the like. Typically, tackifiers are added to these ethylene copolymers to give them their adhesive qualities. The strength of the adhesive bond is generally dependent upon the base copolymer and the tackifier used. For example, an ethylene-vinyl acetate copolymer(EVA) blended with a typical non-polar tackifier generally has poor bond strength in comparison with a similar formulation where the EVA was blended with a polar tackifier. Thus, it would be desirable to develop a modifier that when added would increase the bond strength of EVAs blended with non-polar tackifiers as well as increasing the bond strength of EVAs bonded with polar tackifiers.

SUMMARY OF THE INVENTION

This invention relates to a blend of an ethylene copolymer, a tackifier and a modifier. The ethylene copolymer comprises ethylene and one or more polar monomers, preferably esters, acids, alcohols and the like. The modifier comprises a straight or branched chain aliphatic hydrocarbon having one or more polar groups along the aliphatic structure. The polar groups can be one or more acids, alcohols, esters, amides, amines, ketones, aldehydes or mixtures thereof and the like. These blends are then used as adhesives and the like.

DESCRIPTION OF PREFERRED EMBODIMENTS

This invention relates generally to ethylene copolymers blended with tackifiers and a modifier to produce adhesives, preferably hot melt adhesives, and hot melt pressure sensitive adhesives. It is preferred that the formulation have now water or aqueous components present, however, it is possible that trace amounts of water or moisture may be present in the components. The inventive composition or formulation however, is essentially absent of water or aqueous components or aqueous impurities, thereby being most suitable for hot melt adhesive type formulations. "Essentially absent" means no more than about 0.5 wt. %, preferably less than about 0.2 wt. %, and most preferably, less than about 0.05 wt. % aqueous components or impurities based on the total wt. of the blend may be present in the formulation. The ethylene copolymers which can be used in the blends include ethylene copolymerized with any polar monomer. Examples of polar monomers include, but are not limited to, vinyl acids, alcohols, esters, and the like. Preferred examples include alkylmethacrylates, alkylacrylates, alkylmethacrylic acids and alkylacrylic acids. Even more preferable examples of suitable monomers include vinyl acetate, acrylic acid, methacrylic acid, methacrylate, ethylmethacrylate, methylmethacrylate, ethylacrylate and methylacrylate. In another embodiment the ethylene copolymer may be a polymer of ethylene and an alpha olefin, preferably a $C_3$ to $C_8$ alpha olefin. Examples include ethylene/hexene, ethylene/butene, and ethylene/octene copolymers and the like.

The polar monomers are typically present in the copolymer at about 1 to about 60 wt. %, preferably 5 to about 50 wt. %, even more preferably about 15 to about 40 wt. %. These copolymers are produced by many processes known in the art and are available commercially in many forms. For example, ethylene vinyl acetate copolymers are produced by high pressure free radical polymerization and can be purchased from Exxon Chemical Company under the ESCORENE™ trade name.

The tackifiers used in the blends of this invention include any natural or synthetic tackifier. The tackifier may be polar or non-polar, solid or liquid or both. Examples of suitable tackifiers include, but are not limited to, rosins, rosin esters, tall oil rosin esters, linear, branched or cyclic chain aliphatic tackifiers or tackifiers containing mixtures of the straight, branched or cyclic chain aliphatic components, terpenes, or mixtures of the above or the like. Preferred tackifiers include aliphatics and aliphatic mixtures and rosin esters. Specific preferred tackifiers include ECR-372B, a hydrocarbon tackifier comprising mostly various five and nine carbon olefins, diolefins and aromatics in linear cyclic and/or branched forms, Foral 105 and Bevilite 62-107B which are rosin esters. The tackifier may be present in the blend at up to about 80 wt. %, preferably from about 20 to about 60 wt. %, even more preferably from about 40 to about 60 wt. %.

The modifiers that are used in the blends are aliphatic, linear or branched chain hydrocarbons having a polar group or groups attached along the aliphatic structure. The modifiers are typically a $C_5$–$C_{20}$, preferably $C_{10}$–$C_{15}$, even more preferably $C_{12}$–$C_{15}$ linear or branched chain aliphatic hydrocarbon or blends thereof having one or more similar or different polar groups distributed along the aliphatic structure. The polar groups that can be distributed along the aliphatic structure include acids, alcohols, esters, amides, amines, ketones, aldehydes, acetates, ethers and the like. Preferred examples of polar groups include alcohols, acids and esters.

In general, modifiers comprising linear aliphatic hydrocarbons have been found to be more effective than modifiers of branched aliphatic hydrocarbons. Additional preferred modifiers include linear alphatics with a polar group attached to the terminus of the alphatic chain. Examples of modifiers include linear and/or branched octanol, decanol, decanal, tridecanol, tridecanal, n-heptanoic acid, n-nonanoic acid, isooctanoic acid, isotridecanoic acid, neoheptanoic acid, neodecanoic acid, heptanal, heptyl acetate, heptanone, heptyl amine, heptyl amide, heptyl ether, octyl acetate, octanal, octyl acetate, octanone, octyl amine, octyl amide, octyl ether, nonyl acetate, nonanal, nonyl acetate, nonanone, nonyl amine, nonyl amide, nonyl ether, decyl acetate, decanal, decyl acetate, decanone, decyl amine, decyl amide, decyl ether, tridecyl acetate, tridecanal, tridecyl acetate, tridecanone, tridecyl amine, tridecyl amide, tridecyl ether, dodecanol, dodecanoic acid, dodecyl acetate, dodecanone, dodecyl amine, dodecyl amide and dodecyl ether. Preferred modifiers include Exxal L1315, a mixture of $C_{13}$ and $C_{15}$ linear alphatic alcohols, decyl acetate, tridecyl acetate, and dodecanoic acid.

These modifiers are generally commercially available products and can be purchased from chemical suppliers such as Exxon Chemical Co., Aldrich, Alfa and the like. Some of the modifiers, such as dodecanoic acid, are naturally occurring compositions and others are the product of oxygenation of a petroleum stream. It is within the skill of one of ordinary skill in the art to make or purchase these compositions.

These modifiers are typically present in the blends of the composition at from about 0.05 to about 20 wt. %, preferably about 1.0 to about 15 wt. %, even more preferably about 2 to about 10 wt. %. Waxes, antioxidants and other additives known in the art may be added to the blends of this invention as optional ingredients. These additives include but are not limited to photostabilizers, antioxidants, ultraviolet stabilizers, fillers, plasticizers, lubricants, coloring agents, lubricants and the like.

Examples of fillers include inorganic fillers such as carbon black, silica, calcium carbonate, talc and clay, and organic fillers include high styrene resin, coumarone-indene resin, phenolic resin, lignin, modified melamine resins and petroleum resins.

Examples of lubricants include petroleum type lubricants such as oils, waxes, paraffins and liquid paraffins; coal tar type lubricants such as coal tar, coal pitch; fatty acid oil type lubricants such as castor oil, linseed oil, rapeseed oil, coconut oil, and tall oil; waxes such as beeswax, carnauba wax and lanolin; fatty acids and fatty acid salts such as licinoleic acid, palmitic acid, barium stearate, calcium stearate and zinc laureate; and synthetic polymeric substances such as petroleum resins.

Examples of plasticizers include hydrocarbon oil, paraffins, aromatic and naphthenic oils, phthalic acid esters, adipic acid esters, subacic acid esters and phosphoric type plasticizers.

Examples of coloring agents are organic and inorganic pigments, dyes, and inks.

The blends are produced by ordinary methods known in the art for blending ethylene polymers, tackifiers and the like. For example, an ethylene-vinyl acetate copolymer can be placed in a receptacle, heated and stirred. "Heating typically occurs at a temperature to have all components in the molten state, generally greater than about 80° C., preferably greater than about 100° C." Tackifier can be added to the receptacle and the modifier added to the receptacle so that a uniform dispersion is obtained. Blends of this invention have improved adhesive properties when compared to similar blends lacking the modifier.

The blends of this invention can then be used as adhesives on substrates such as asphalt, cement, metals (including aluminum), MYLAR™, polymers (including polyolefins such as rubbers, plastics, thermoplastics), glass, ceramics, wood, paper, rocks, minerals and paint, cardboard, and the like. Preferred examples include polyethylene, polypropylene and aluminum. These adhesives can also be used as a laminate, as a hot melt adhesive, as a bookbinding adhesive, as a packaging adhesive, as a structural adhesive, as an automotive adhesive, as a wood adhesive, as an upholstery adhesive, and as an adhesive for affixing reflectors to asphalt and the like. Preferred uses include hot melt adhesives, and the like.

The following are examples of embodiments of the invention and should not be construed to limit the invention.

EXAMPLES

In the examples below, a series of hot melt adhesives (HMA) based on an ethylene-vinyl acetate comprising 28 wt. % vinyl acetate was formulated using various tackifiers and modifiers. Formulations were prepared in stainless steel beakers at a temperature of about 150 degrees C with a blanket of nitrogen covering the materials. Once the components had melted in the quiescent state, a propeller type stirrer that just touched the top of the materials was used to mix them. Stirring was continued for 30 minutes after visual inspection indicated that a homogeneous blend had been achieved.

Each of the HMA formulations was laid out to form a thin film suitable for bonding. The HMA was heated to 150 degrees C in an oven then laid out on release paper using the 0.006 inch channel of an eight path applicator. The resulting film had a thickness of about 0.005 inch. The HMA films were used to bond cast films of polypropylene 0.004" thick. Seals were made in a hot press heated to 150 degrees C, the adhesive being sandwiched between polypropylene film using a pressure of approximately 100 psi for 10 seconds. Molding plates of aluminium ⅟₃₂" thick were used to separate the polypropylene film from the platens of the press. After sealing, the bonds were quenched between water cooled platens at approximately 25 degrees C using a pressure of approximately 100 psi. For the purposes of T-peel testing, 0.5" strips were cut from the bonded sandwich of polypropylene film and HMA. Test pieces were allowed to age for a minimum of 48 hours prior to evaluating the strength of the bond.

T-peel, a measure of adhesive strength, testing was carried out at room temperature on an Instron 4505 testing frame with an extension rate of 2"/min and a sampling rate of 2 points/sec. In the case of adhesives exhibiting only slip/stick failure, (slip/stick is erratic adhesive failure and/or widely fluctuating peel force) the T-peel strength was taken as the average of the peaks on the force/deformation plot. In cases where both smooth peel and slip/stick were exhibited by the same sample, the average value of the smooth peel regions was taken as the T-peel strength. For each HMA formulation five samples were tested and the results averaged.

EXAMPLE 1

In the following experiments, the EVA was present at 40 weight percent with the modifier being added at the expense of the tackifier. These data show that linear acids and alcohols are more effective as bond strength enhancers than their branched counterparts. In the case of acids, the more highly branched neo acids are less effective than the iso acids. Various blends and testing results are listed in Table 1 below. $C_{13}/C_{15}$ is a mixture of $C_{13}$ and $C_{15}$ straight chain alcohols. ECR-372B is a hydrocarbon tackifier comprising mostly various five and nine carbon olefins, diolefins and aromatics in straight, cyclic and/or branched forms, Foral 105 and Bevilite 62-107 are rosin esters.

TABLE 1

| Tackifier type | Modifier type | Modifier | Modifier (%) | Viscosity @ 10 RPM | T-peel strength (lb/in) | Failure type |
|---|---|---|---|---|---|---|
| ECR 372B | — | — | — | 11,100 | 0.8 | Adhesive s/s |
| ECR 372B | White oil | | 2.5 | 9,400 | 1.5 | Adhesive smooth |
| ECR 372B | | | 5 | 8,630 | 2.3 | Adhesive smooth |
| ECR 372B | | | 7.5 | 7,400 | 3.0 | Adhesive smooth |
| ECR 372B | PIB | | 5 | 9,600 | 2.6 | Adhesive s/s* |
| ECR 372B | 1-Naphthol | | 3.8 | 10,200 | 1.0 | Adhesive s/s |
| ECR 372B | Zinc stearate | | 8.25 | 11,000 | 0.3 | Adhesive s/s |
| ECR 372B | Linear alcohol | Dodecanol | 2.5 | 9,670 | 1.9 | Adhesive smooth |
| ECR 372B | | Dodecanol | 5.0 | 7,400 | 1.9 | Adhesive smooth |
| ECR 372B | | Dodecanol | 7.5 | 6,630 | 2.2 | Adhesive smooth |
| ECR 372B | | $C_{13}/C_{15}$ mix | 2.9 | 9,080 | 2.2 | Adhesive smooth |
| ECR 372B | | $C_{13}/C_{15}$ mix | 5.8 | 7,130 | 3.8 | Adhesive smooth |
| ECR 372B | | $C_{13}/C_{15}$ mix | 8.7 | 6,250 | 4.1 | Adhesive smooth |
| | | | | | 9.5 | Cohesive smooth |
| ECR 372B | | Octadecanol | 6.9 | 6,220 | 0.5 | Adhesive s/s |
| ECR 372B | Branched alcohol | Octanol | 3.5 | 10,000 | 1.4 | Adhesive smooth |
| ECR 372B | | Decanol | 4.2 | 8,320 | 1.5 | Adhesive smooth |
| ECR 372B | | Tridecanol | 5.4 | 8,200 | 2.6 | Adhesive smooth |
| ECR 372B | Linear acid | Heptanoic | 3.5 | 8,580 | 2.0 | Adhesive smooth |
| ECR 372B | | Nonanoic | 4.2 | 8,200 | 2.4 | Adhesive smooth |
| ECR 372B | | Dodecanoic | 2.7 | 9,000 | 2.0 | Adhesive smooth |
| ECR 372B | | Dodecanoic | 5.3 | 8,350 | 1.8 | Adhesive smooth |
| ECR 372B | | Dodecanoic | 8.1 | 7,800 | 3.5 | Adhesive smooth |
| ECR 372B | | Octadecanoic | 7.4 | 6,000 | 0.9 | Adhesive s/s* |
| ECR 372B | Iso acid | Octanoic | 3.9 | 8,980 | 1.8 | Adhesive smooth |
| ECR 372B | | Tridecanoic | 5.8 | 7,900 | 2.5 | Adhesive smooth |
| ECR 372B | Neo acid | Heptanoic | 3.5 | 10,000 | 1.3 | Adhesive smooth |
| ECR 372B | | Docanoic | 4.6 | 8,530 | 1.7 | Adhesive smooth |
| ECR 372B | Linear ester | Heptyl acetate | 4.2 | 9,520 | 1.7 | Adhesive smooth |
| ECR 372B | | Octyl acetate | 4.6 | 10,400 | 1.6 | Adhesive smooth |
| ECR 372B | | Nonyl acetate | 5 | 9,080 | 2.0 | Adhesive smooth |
| ECR 372B | | Decyl acetate | 2.7 | 9,570 | 1.7 | Adhesive smooth |
| ECR 372B | | Decyl acetate | 5.4 | 8,900 | 2.3 | Adhesive smooth |
| ECR 372B | | Decyl acetate | 8.1 | 6,200 | 3.5 | Adhesive smooth |
| ECR 372B | | Tridecyl acetate | 3.3 | 7,380 | 1.8 | Adhesive smooth |
| ECR 372B | | Tridecyl acetate | 6.5 | 7,300 | 3.3 | Adhesive smooth |
| | | | | | 9.4 | Cohesive smooth |
| ECR 372B | | Tridecyl acetate | 9.8 | 7,080 | 4.6 | Adhesive smooth |
| | | | | | 9.3 | Cohesive smooth |
| Foral 105 | — | — | — | | 1.7 | Adhesive s/s* |
| Foral 105 | Linear alcohol | $C_{13}/C_{15}$ mix | 8.7 | | 7.5 | Cohesive smooth |
| Foral 105 | Linear ester | Tridecyl acetate | 9.8 | | 7.9 | Adhesive smooth |
| Bevilite 62-107 | — | — | — | | 0.4 | Adhesive s/s* |
| Bevilite 62-107 | Linear alcohol | $C_{13}/C_{15}$ mix | 8.7 | | 9.6 | Cohesive/adhesive smooth |
| Bevilite 62-107 | Linear ester | Tridecyl acetate | 9.8 | | 7.7 | Cohesive smooth |

*s/s = slip/stick

Example 2

The effect of bonding pressure on T-peel strength of certain hot melt adhesives was determined. The procedures set out in Example 1 were followed. An ethylene-vinyl acetate copolymer containing 28% vinyl acetate was blended with ECR372B which is a hydrocarbon tackifier comprising mostly various five and nine carbon olefins, diolefins and aromatics in straight, cyclic and/or branched forms, Foral 105 and Bevilite 62–107 are rosin esters and various modifiers. The blends and the T-peel strengths at 100–200 psi are reported in Table 2.

TABLE 2

| Modifier | EVA/Tackifier/ Modifier | T-Peel Bonded Strength, at | |
|---|---|---|---|
| | | 100 psi | 200 psi |
| | 80/20/0 | 3.4 | 4.4 |
| | 60/40/0 | 3.6 | 3.5 |
| | 50/50/0 | 1.5 | 3.3 |
| | 40/60/0 | 0.8 | 0.7 |
| n-dodecanol | 40/57.5/2.5 | 1.9 | 3.5 |
| n-dodecanol | 40/55/5 | 1.9 | 6.0 |
| n-dodecanol | 40/52.5/7.5 | 2.2 | 10.0 |
| n-dodecanoic acid | 40/54.7/5.3 | 1.8 | 13.5 |
| 1-naphthol | 40/51.75/8.25 | 1.0 | 1.2 |

As is apparent from the foregoing description, the materials prepared and procedures followed relate to specific embodiments of the broad invention. It is apparent from the foregoing general description and the specific embodiments that, while forms of the invention have been illustrated and described, various modifications can be made without departing from the spirit and scope of this invention. Accordingly, it is not intended that the invention be limited thereby.

I claim:

1. A hot melt adhesive composition consisting essentially of a blend of:
   (a) a copolymer of ethylene and from 1 to 60 weight percent of an alkylmethacrylate, an alkylacrylate, an alkylmethacrylic acid, an alklyacrylic acid, or a vinyl acetate, based upon the weight of the copolymer;
   (b) a tackifier in an amount ranging from 20 to 80 weight percent of the composition; and
   (c) a modifier comprising a linear or branched chain aliphatic hydrocarbon having from five to twenty carbon atoms and one of the group consisting of alcohol, ester, amide, amine, ketone, ether, or aldehyde group attached to the terminus of the aliphatic structure, said modifier present in an amount ranging from 0.05 to 20 weight percent of the composition.

2. The composition of claim 1 wherein the polar monomer is present at 5 to 50 wt. %, based upon the weight of the ethylene polymer.

3. The composition of claim 1 wherein the polar monomer is present at 15 to 40 wt. %, based upon the weight of the ethylene polymer.

4. The composition of claim 1 wherein the tackifier is a polar or non-polar rosin, rosin ester, linear chain aliphatic, branched chain aliphatic, cyclic aliphatic, or a mixture of linear, branched or cyclic aliphatics, terpene or mixtures thereof.

5. The composition of claim 1 wherein the tackifier is a mixture of cyclic and linear aliphatics or aromatics having 5 to 10 carbon atoms.

6. The composition of claim 1 wherein the modifier is a $C_5$–$C_{20}$ straight chain aliphatic compound.

7. The composition of claim 1 wherein the modifier is a $C_5$–$C_{20}$ branched chain aliphatic compound.

8. The composition of claim 1 wherein the modifier is dodecanol, octadecanol, octanol, decanol, tridecanol, heptanoic acid, nonanoic acid, dodecanoic acid, octadecanoic acid, tridecanoic acid, heptanoic acid, decanoic acid, heptyl acetate, octyl acetate, nonyl acetate, decyl acetate, tridecyl acetate, or mixtures thereof.

9. The composition of claim 1 wherein the copolymer is ethylene vinyl acetate and the modifier is a blend of a $C_{13}$ and a $C_{15}$ linear aliphatic alcohols.

10. The composition of claim 1 wherein the copolymer is ethylene vinyl acetate having 15–40 wt. % vinyl acetate, the modifier is a blend of a $C_{13}$ and a $C_{15}$ alcohols, dodecanol, dodecanoic acid, octanol, tridecanol, tridecanoic acid, octanoic acid, decyl acetate, tridecyl acetate, or mixtures thereof.

11. The composition of claim 1 wherein the modifier is present at 1–15 wt. % and the tackifier is non-polar.

12. The composition of claim 1 wherein the tackifier is a rosin ester.

13. The composition of claim 1 wherein the modifier is a $C_{10}$ to $C_{15}$ straight or branched chain aliphatic comprising one polar group.

14. The composition of claim 1 wherein the modifier is a $C_{12}$ to $C_{15}$ straight or branched chain aliphatic hydrocarbon comprising one polar group.

15. A method for improving adhesion of a hot melt adhesive, said method comprising blending a hot melt adhesive consisting essentially of a copolymer of ethylene and from 1 to 60 weight percent of an alkylmethacrylate, an alkylacrylate, an alkylmethacrylic acid, an alklyacrylic acid, or a vinyl acetate, based upon the weight of the copolymer and a tackifier with a modifier, said modifier being a $C_5$–$C_{20}$ straight chain or branched chain aliphatic hydrocarbon having one polar group at the chain terminus.

16. The method of claim 15 wherein the modifier is a $C_5$–$C_{20}$ straight chain aliphatic compound.

17. The method of claim 15 wherein the modifier is a $C_5$–$C_{20}$ branched chain aliphatic compound.

18. The method of claim 15 wherein the modifier is a $C_{10}$ to $C_{15}$ straight or branched chain aliphatic.

19. The method of claim 15 wherein the modifier is a $C_{12}$ to $C_{15}$ straight or branched chain aliphatic.

20. The method of claim 15 wherein the tackifier is non-polar.

21. The method of claim 15 wherein the tackifier is a rosin, rosin ester, tall oil rosin, straight chain aliphatic, branched chain aliphatic, cyclic chain aliphatic, a mixture of straight and branched chain aliphatics, a mixture of straight and cyclic aliphatics, a mixture of branched and cyclic aliphatics, or a mixture of straight, cyclic and branched aliphatics, a terpene or a mixture thereof.

22. A laminate, hot melt adhesive, bookbinding, an upholstery adhesive, wood adhesive, automotive adhesive, cement adhesive or asphalt adhesive comprising the composition of claim 1.

23. The composition of claim 1 coated onto metal, plastic, thermoplastic, rubber, polyolefin, glass, ceramic, mineral, rock, wood, paper, paint, cardboard, asphalt or cement.

24. The method of claim 15 wherein the modifier is present at 1–15 wt. % and the tackifier is non polar.

25. The method of claim 15 wherein the blending occurs at a temperature sufficient to have all components in the molten state.

26. The method of claim 25 wherein the blending temperature is greater than about 80° C.

27. The composition of claim 1 essentially free of aqueous components.

* * * * *